United States Patent Office 3,509,154
Patented Apr. 28, 1970

---

3,509,154
S-OXIDES OF 10-ALKYLPIPERAZINO-10,11-DIHYDRODIBENZO[b,f]THIEPINES
Jean Clement Louis Fouche, Bourg-la-Reine, Hauts-de-Seine, France, assignor to Rhone-Poulenc S.A., Paris, France, a French body corporate
No Drawing. Filed Aug. 15, 1966, Ser. No. 572,207
Claims priority, application France, Aug. 23, 1965, 29,156, Patent 1,478,355; Dec. 16, 1965, 42,629, Patent 1,505,342
Int. Cl. C07d 67/00
U.S. Cl. 260—268        3 Claims

ABSTRACT OF THE DISCLOSURE

The invention provides 10-(4-lower alkyl-1-piperazinyl)-10,11-dihydro[b,f]thiepine 5-oxides and 5,5-dioxides which have useful antihistaminic activity.

---

This invention relates to new therapeutically useful derivatives of dibenzo[b,f]thiepine, to processes for their preparation and pharmaceutical compositions containing them.

According to the present invention, there are provided the new dibenzo[b,f]thiepine derivatives of the general formula:

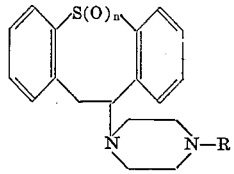

wherein $n$ represents 1 or 2, R represents a hydrogen atom or an alkyl, hydroxylalkyl, hydroxyalkoxyalkyl or phenylalkyl group in which the phenyl ring optionally carries one or more substituents selected from halogen atoms and alkl, alkoxy, nitro, amino and trifluoromethyl groups, and one or more of the carbon atoms of the piperazine ring may carry a methyl substituent, and acid addition and quaternary ammonium salts thereof. In this specification and accompanying claims all the alkyl and alkoxy groups mentioned contain at most five carbon atoms.

The aforesaid dibenzothiepine compounds possess useful pharmacodynamic properties; in particular, they have a very good antihistaminic activity. Preferred compounds are those in which R represents an alkyl or phenylalkyl group, and more particularly those in which R represents methyl, e.g., 10-(4-methyl-1-piperazinyl)-10,11-dihydrodibenzo[b,f]thiepine - 5 - oxide and 10-(4-methyl-1-piperazinyl)-10,11-dihydrodibenzo[b,f]thiepine - 5,5 - dioxide, and acid addition and quarternary ammonium salts thereof.

According to a feature of the invention, the compounds of Formula I are prepared by the process which comprises oxidising a dibenzo[b,f]thiepine derivative of the formula:

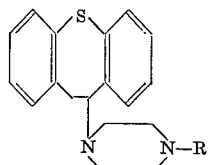

(wherein R is as hereinbefore defined, and one or more of the carbon atoms of the piperazine ring may carry a methyl substituent) by methods known per se for the oxidation of sulphides to sulphoxides or sulphones. By the term methods known per se as used in this specification and accompanying claims is meant methods heretofore used or described in the chemical literature. It is particularly advantageous to effect oxidation of the starting materials of Formula II by means of hydrogen peroxide in the presence of acetic acid.

The dibenzo[b,f]thiepine derivatives of Formula II can be obtained by reacting a compound of the formula:

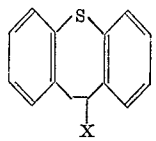

wherein X represents the acid residue of a reactive ester, such as a halogen atom or the residue of a sulphuric or sulphonic ester (for example methanesulphonyloxy or toluene-p-sulphonyloxy), with a piperazine derivative of the formula:

wherein R is as hereinbefore defined, and one or more of the carbon atoms of the piperazine ring may carry a methyl substituent.

The compounds of Formula III can be prepared from the corresponding alcohol of formula:

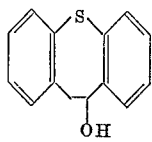

by methods known per se for obtaining reactive esters from alcohols. The alcohol of Formula V, i.e., 10-hydroxy-10,11-dihydrodibenzo[b,f]thiepine, is obtainable by the method described by J. O. Jilek et coll., Monatsh. Chem., 96, 183 (1965).

According to another feature of the invention, the compounds of Formula I are prepared by the process which comprises reacting an ester of the formula:

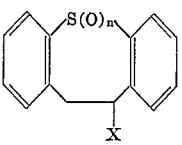

(wherein $n$ and X are as hereinbefore defined) with a piperazine derivative of Formula IV. It is advantageous to carry out the reaction in an inert organic solvent, such as an aromatic hydrocarbon (e.g., toluene or xylene), preferably at the boiling point of the solvent, and to use an excess of the piperazine derivative of Formula IV as acid binding agent.

The ester starting materials of Formula VI can be obtained by oxidising dibenzo[b,f]thiepine derivatives of Formula III by methods known per se for the oxidation of sulphides to sulphoxides or sulphones. The oxidation is preferably carried out with hydrogen peroxide in the presence of acetic acid or by means of an organic peracid, such as perbenzoic acid or p-nitroperbenzoic acid.

The new compounds of general Formula I obtained according to the foregoing processes may be purified by physical methods such as distillation, crystallisation or chromatography, or by chemical methods such as the formation of salts, crystallisation of the salts and decomposition of these in an alkaline medium. In the said chemical method, the nature of the salt is immaterial, the only requirement being that the salt be well defined and readily crystallisable.

The basic compounds of Formula I may be converted by methods known per se into acid addition and quaternary ammonium salts. The acid addition salts may be obtained by the action of acids on the compounds in appropriate solvents. As organic solvents there may be used, for example, alcohols, ethers, ketones or chlorinated hydrocarbons. The acid addition salt which is formed is precipitated, if necessary after concentration of its solution, and is separated by filtration or decantation. The quaternary ammonium salts may be obtained by the action of esters on the compounds, optionally in an organic solvent at ambient temperature or, more rapidly, with gentle heating.

For therapeutic purposes, the dibenzo[b,f]thiepine derivatives of Formula I are employed as such or in the form of nontoxic acid addition salts, i.e., salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, theophyllinacetates, salicylates, phenolphthalinates and methylene-bis-$\beta$-hydroxynaphthoates), so that the beneficial physiological properties inherent in the bases are not vitiated by side-effects ascribable to the anions. They may also be employed in the form of nontoxic quaternary ammonium salts obtained by reaction with organic halides (e.g., methyl, ethyl, allyl or benzyl chloride, bromide or iodide) or other reactive esters, e.g., methyl- or ethyl-sulphates, benzenesulphonates or toluene-p-sulphonates.

The following examples illustrates the invention.

EXAMPLE I

A solution of 10-(4-methyl-1-piperazinyl)-10,11-dihydrodibenzo[b,f]thiepine (12.3 g.), M.P. 135° C., in glacial acetic acid (120 cc.) is treated at 15–20° C. with hydrogen peroxide (112 vols; 4.8 cc.). The mixture is left at ambient temperature for 20 hours and then treated with distilled water (1200 cc.) and diethyl ether (300 cc.). The decanted aqueous solution is cooled in an ice-bath and made alkaline with aqueous sodium hydroxide (d=1.33; 300 cc.). The oil which separates is extracted three times with diethyl ether (total 600 cc.). The combined ethereal solutions are washed three times with distilled water (total 600 cc.), dried over anhydrous sodium sulphate and evaporated. The crystalline residue (10 g.) is dissolved in boiling ethyl acetate (30 cc.). After 17 hours cooling at 3° C., the crystals which separate are filtered off, washed twice with ice-cold ethyl acetate (total 10 cc.) and dried under reduced pressure (20 mm. Hg). 10-(4-methyl-1-piperazinyl)-10,11-dihydrodibenzo[b,f]thiepine - 5 - oxide (4.5 g.), M.P. 161° C., is thus obtained.

10 - (4 - methyl - 1 - piperazinyl) - 10,11 - dihydrodibenzo[b,f]thiepine employed as starting material is prepared according to J. O. Jilek et coll., Monatsch. Chem., 96, 205 (1965).

EXAMPLE II

Crude crystalline 10 - chloro - 10,11 - dihydrodibenzo [b,f]thiepine-5,5-dioxide (36 g.), M.P. about 160° C., is treated with anhydrous toluene (425 cc.) and 1-methylpiperazine (48.8 g.). The reaction mixture is heated under reflux for 6 hours. After cooling, distilled water (400 cc.) and aqueous sodium hydroxide (d=1.33; 5 cc.) are added. The insoluble product which separates is filtered off, washed successively with distilled water (50 cc.), twice with toluene (total 200 cc.) and with diethyl ether (100 cc.). The filtrate is decanted. The organic solution is washed three times with distilled water (total 750 cc.) and extracted twice with an aqueous ice-cold 2 N solution of methanesulphonic acid (total 500 cc.). The combined acid solutions are washed with diethyl ether (250 cc.) and then made alkaline with aqueous sodium hydroxide (d=1.33; 120 cc.). The precipitate obtained is extracted three times with methylene chloride (total 900 cc.). The combined methylene chloride solutions are washed three times with distilled water (total 1500 cc.) until neutral, dried over anhydrous potassium carbonate and evaporated. The oily residue obtained (10.1 g.) is dissolved under reflux in acetonitrile (25 cc.). After 3 hours cooling at 5° C., the crystals which separate are filtered off, washed twice with ice-cold acetonitrile (total 20 cc.) and dried under reduced pressure (20 mm. Hg). 10-(4-methyl-1 - piperazinyl) - 10,11 - dihydrodibenzo[b,f]thiepine-5,5-dioxide (7 g.), M.P. 140° C., is thus obtained.

10 - chloro - 10,11 - dihydrodibenzo[b,f]thiepine - 5,5-dioxide employed as starting material is prepared in the following manner:

A solution of 10-chloro-10,11-dihydrodibenzo[b,f]thiepine (30 g.) in chloroform (120 cc.) is added over a period of 10 minutes to a suspension of p-nitroperbenzoic acid (57.5 g.) in chloroform (500 cc.). The reaction mixture is stirred for 24 hours at a temperature kept between 25 and 30° C. by cooling.

The insoluble p-nitrobenzoic acid is filtered off and washed four times with chloroform (total 400 cc.). The chloroformic filtrate is washed three times with an ice-cold 5% aqueous solution of sodium bicarbonate (total 1500 cc.) and then twice with distilled water (total 800 cc.). The chloroform solution is dried over anhydrous magnesium sulphate and evaporated under reduced pressure (40–50 mm. Hg) at a temperature which does not exceed 40° C. Crude crystalline 10-chloro-10,11-dihydrodibenzo[b,f]thiepine-5,5-dioxide (36 g.), M.P. about 160° C., is thus obtained.

10 - chloro - 10,11 - dihydrodibenzo[b,f]thiepine is prepared according to J. O. Jilek et coll., Monatsch. Chem. 96, 204 (1965).

EXAMPLE III

By proceeding as described in Example II but starting with 10 - chloro - 10,11 - dihydrodibenzo[b,f]thiepine-5,5-dioxide (37 g.) and 1-benzylpiperazine (64.5 g.), 10-(4 - benzyl - 1 - piperazinyl) - 10,11 - dihydrodibenzo [b,f]thiepine-5,5-dioxide (11.6 g.), M.P. 160° C., is obtained after crystallisation of the crude product (15.6 g.) from boiling ethanol (250 cc.).

The present invention includes within its scope pharmaceutical compositions comprising, as active ingredient, at least one of the dibenzothiepine derivatives of Formula I, or nontoxic acid addition or quaternary ammonium salt thereof, in association with a pharmactutical carrier or coating. The invention includes especially such preparations made up for oral, parenteral or rectal administration.

Solid compositions for oral administration include tablets, pills, powders, and granules. In such solid compositions the active compound is admixed with at least one inert diluent such as sucrose, lactose or starch. The compositions may also compise, as is normal practice, additional substances other than inert diluents, e.g., lubricating agents such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and perfuming agents. The compositions according to the invention, for oral administration, also include capsules or absorbable material such as gelatin containing the active substance with or without the addition of diluents or excipients.

Preparations according to the invenion for parenteral administration include sterile aqueous or nonaqueous solutions, suspensions, or emulsions. Examples of nonaqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories containing, in addition to the active substances, excipients such as cacao butter or a suppository-wax.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In the case of oral administraion, the dosages are generally beween 5 mg. and 200 mg. of active substance per day for an adult.

The following examples illustrate pharmaceutical compositions according to the invention.

EXAMPLE IV

Tablets of the following composition are prepared in the usual way:

|  | Mg. |
|---|---|
| 10 - (4 - methyl - 1 - piperazinyl) - 10,11 - dihydro-dibenzo[b,f]thiepine-5-oxide | 5 |
| Starch | 110 |
| Colloidal silica | 32 |
| Magnesium stearate | 3 |

EXAMPLE V

Tablets of the following composition are prepared in the usual way:

|  | Mg. |
|---|---|
| 10 - (4 - methyl - 1 - piperazinyl) - 10,11 - dihydro-dibenzo[b,f]thiepine-5-oxide | 25 |
| Starch | 92 |
| Colloidal silica | 30 |
| Magnesium stearate | 3 |

Tablets analogous to those described in Examples IV and V can be produced by replacing the 10-(4-methyl-1-piperazinyl)-10,11-dihydrodibenzo[b,f]thiepine - 5 - oxide by the same weight of 10-(4-methyl-1-piperazinyl)-10,11-dihydrodibenzo[b,f]thiepine-5,5-dioxide or any other compound within the scope of Formula I.

I claim:

1. A dibenzo[b,f]thiepine of the formula:

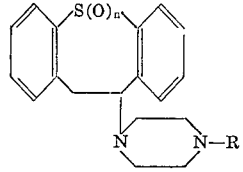

wherein $n$ is 1 or 2, R is alkyl of at most five carbon atoms, and its nontoxic acid addition salts.

2. The dibenzo[b,f]thiepine according to claim 1 wherein $n$ is 1 and R is methyl, and its nontoxic acid addition salts.

3. The dibenzo[b,f]thiepine according to claim 1 wherein $n$ is 2 and R is methyl, and its nontoxic acid addition salts.

References Cited

UNITED STATES PATENTS

| 3,054,791 | 9/1962 | Yale | 260—268 X |
| 3,117,121 | 1/1964 | Anderson | 260—268 X |
| 3,126,411 | 3/1964 | Bellet et al. | 260—268 X |
| 3,257,404 | 6/1966 | Fouche | 260—268 |
| 3,337,554 | 8/1967 | Jilek | 260—327 X |
| 3,351,599 | 11/1967 | Protiva et al. | 260—268 |
| 3,379,729 | 4/1968 | Protiva et al. | 260—268 |

DONALD G. DAUS, Primary Examiner

U.S. Cl. X.R.

260—687, 327; 424—250